US005291241A

United States Patent [19]

Hirano et al.

[11] Patent Number: 5,291,241

[45] Date of Patent: Mar. 1, 1994

[54] OPTICAL DEVICE

[75] Inventors: Hiroyuki Hirano, Yokohama; Nobutaka Minefuji, Hokkai; Yasunori Arai, Saitama; Minoru Suzuki, Omiya, all of Japan

[73] Assignee: Asahi Kogaku Kogyo Kabushiki Kaisha, Tokyo, Japan

[21] Appl. No.: 777,576

[22] Filed: Oct. 16, 1991

[30] Foreign Application Priority Data

Oct. 16, 1990 [JP] Japan ..... 2-278547
May 28, 1991 [JP] Japan ..... 3-226639

[51] Int. Cl.[5] ..... G03B 27/52

[52] U.S. Cl. ..... 355/55; 359/697; 355/58

[58] Field of Search ..... 355/55, 56, 57, 58; 359/694, 696, 697, 698; 354/408

[56] References Cited

U.S. PATENT DOCUMENTS 4,322,159 3/1982 Takahashi et al. ..... 355/57
4,420,248 12/1983 Ogawa et al. ..... 355/57
4,557,594 12/1985 Negoro ..... 355/58
4,825,252 4/1989 Suzuki et al. ..... 355/32
4,881,799 11/1989 Ohno et al. ..... 350/429
4,974,948 12/1990 Arai et al. ..... 350/423

FOREIGN PATENT DOCUMENTS 63-311275 12/1988 Japan .

*Primary Examiner*—Richard A. Wintercorn
*Attorney, Agent, or Firm*—Sandler Greenblum & Bernstein

[57] ABSTRACT

In an imaging apparatus, a magnified image of an object is formed on a predetermined plane through a plurality of lens groups. A plurality of filters are selectively inserted into the light path between the object and the predetermined plane. An optical device is provided in the imaging apparatus, in which the plurality of lens groups are driven as a unit along the optical axis while the positional relation among the respective lens groups are correspondingly changed, wherein at least one of the plurality of lens groups is independently driven along the optical axis. The plurality of lens groups are driven to move in accordance with a desired image magnification, and at-least-one of the plurality of lens groups is independently driven, depending upon the selected filter, so as to place the object image on the predetermined plane.

20 Claims, 8 Drawing Sheets

OPTICAL DEVICE

BACKGROUND OF THE INVENTION

The present invention relates to an optical device for a color copy machine and the like which is capable of forming an object image on a light receiving plane at different magnifications.

Conventionally, this kind of optical device is constructed as follows:

A zoom lens is mounted on a carriage, and a carriage drive mechanism is disposed on the base plate on the side of the main body of the copy machine. Further, a guide rail for guiding the carriage is disposed in the direction of the optical axis of the zoom lens. Further, pulleys and a wire are interposed between the carriage and the carriage drive mechanism for transmitting the driving force of the drive mechanism to the carriage. Thus, the carriage is driven by the carriage drive mechanism by means of the pulleys and the wire, and is moved in the direction of the optical axis of the zoom lens as the carriage drive mechanism is operated.

In the construction described above, a stray light prevention member covering the zoom lens from the upper side thereof is provided for preventing stray light caused by an illuminating light from entering the zoom lens.

Nevertheless, in the conventional devices, since the carriage drive mechanism is mounted on the main body, an escape portion is interposed between the stray light prevention mechanism and the carriage drive mechanism so that they are not brought into contact to each other. Even if a small amount of a stray light enters the zoom lens through the slight gap of the escape portion, a formed image may become unclear, and furthermore, the stray light may affect the formed image significantly in the case of a color copy.

Further, the length of the guide rail must be increased with maintaining the accuracy of a copied image when the magnification changing range is widened. Accordingly, if a fragile guide rail is used, the carriage may jolt to the right and left on the horizontal plane. As a result, a long and thick guide rail of high strength is required, which causes weight of the device and manufacture cost to be raised.

Furthermore, since a base plate should be provided with the main body of the device in order to mount the carriage drive mechanism thereon, the size of the device is increased as a whole, efficiency for shipping of the device becomes low and the cost of the device is increased.

Recently, a copy machine capable of producing a colored copy has become known. In such a copy machine capable of producing a colored copy of an original, a plurality of filters: M (monochrome); B (blue); G (Green); and R (red) filters, are selectively inserted between the original and the image receiving plane in order to obtain the image data corresponding to respective colors.

In this case, since a lens brings the different colors of light of focus at different points, i.e., a chromatic abberation exists, it is necessary to use a lens having less chromatic abberation. However, the problem arises in that it is difficult to make a lens to have low chromatic abberation in various magnification ranges. Further, there exists a manufacturing error of the lens, and device, which makes it further difficult to compensate the chromatic abberation.

SUMMARY OF THE INVENTION

It is therefore an object of the present invention to provide an improved optical device capable of readily compensating for the affect of the chromatic abberation of the lens corresponding to the colors of light.

Another object of the present invention is to provide an improved optical device capable of employing a shield member for sufficiently preventing stray light (ambient light) due to an illuminating light of the apparatus from entering the lens.

For the above object, according to one aspect of the invention, there is provided an optical device employed in an imaging apparatus in which an image of an object is formed on a predetermined plane through a plurality of lens groups, wherein the plurality of lens groups are coaxially arranged and used for changing the magnification of the object image formed on the predetermined plane, and a plurality of filters for respectively allowing predetermined colors of light to pass therethrough is selectively inserted into the light path between the object and the predetermined plane. The optical device comprise:

a first drive mechanism for driving the plurality of lens groups as a unit along the optical axis thereof while correspondingly changing the positional relation among the respective lens groups;

a second drive mechanism for independently driving at-least-one of the plurality of lens groups along the optical axis;

a first control mechanism for controlling the first and second drive mechanism to drive the plurality of lens groups in accordance with a desired image magnification; and a second control mechanism for controlling the second drive mechanism to drive at-least-one of the plurality of lens groups, depending upon the selected filter, so as to place the object image on the predetermined plane.

Optionally, the first drive mechanism comprises:

a carriage member arranged to be movable along the optical axis, on which the plurality of lens groups are mounted with allowing movements of the respective lens group relative to others;

a position regulating member mounted on the carriage member, upon movement of which the positional relation among the respective lens groups is changed in a predetermined manner;

a driving source carried by the carriage member; and a transmittal mechanism carried by the carriage member for transmitting driving force of the driving source simultaneously to the carriage member and to the position regulating member in such a fashion that the position regulating member is moved in a predetermined manner corresponding to the movement of the carriage member along the optical axis.

Further, the position regulating member comprises a rotatable disk member formed with a predetermined cam groove, wherein each of the lens groups is provided with a pin-shaped protrusion which is engaged with the cam groove, and the positional relationships among the protrusions is changed upon rotation of the disk member.

Furthermore, the second drive mechanism comprises a swing arm member formed with a cam slit, wherein the pin-shaped protrusion of said at-least-one lens group is engaged with the cam slit, and the protrusion of the at-least-one lens group is moved along the cam groove upon movement of the swing arm member, whereby the at-least-one lens group is independently moved relative to the other lens groups.

Further optionally, the first control mechanism comprises a memory device for storing therein magnification data of the positional relations of the plurality of lens groups for possible magnifications, and a first calculating device for calculating the driving amount of the lens groups based on one of the magnification data corresponding to the desired magnification.

Further optionally, the second control mechanism comprises a memory means storing therein compensation data of the positional relation of the at least-one lens group with respect to the others, for respective one of the plurality of filters; and a second calculating device for calculating the driving amount of the at-least-one lens group based on one of the compensation data corresponding to the selected filter.

The memory device further stores basic data for compensating the positional relation of the at-least-one lens group with respect to the others, for respective one of the plurality of filters, and wherein the second control mechanism comprises second calculating device for calculating the driving amount of the at-least-one lens group based upon the basic data for the selected filter.

According to another aspect of the invention, there is provided an optical device employed in an imaging apparatus in which an image of an object is formed on a predetermined plane through a plurality of lens groups, the plurality of lens groups being moved, respectively, in order to change the magnification of the object image formed on the predetermined plane; The optical device comprises:

a carriage member carrying the plurality of lens groups with allowing movements of the respective lens group relative to others;

a position regulating member mounted on the carriage member, upon movement of which the positional relation among the respective lens groups is changed in a predetermined manner;

a driving source carried by the carriage member; and a transmittal mechanism carried by the carriage member for transmitting driving force of the driving source simultaneously to the carriage member and to the position regulating member in such a fashion that the position regulating member is moved in the predetermined manner corresponding to the movement of the carriage member along the optical axis.

Optionally, the optical device further comprises:

a pair of rail members extending in parallel along the optical axis of the plurality of lens groups, at least one of the pair of rail members being formed with a rack portion;

a shaft member rotatably arranged on the carriage member extending in the direction orthogonal to the extending direction of the rail members;

at least one pinion gear member fixed at the end of the shaft member for being meshed with the rack portion; and a transmitting mechanism for transmitting the driving force of the drive source to the shaft member to rotate the same, whereby the carriage member is driven by means of the engagement between the pinion gear member and the rack portion.

Further, the position regulating member comprises a rotatable disk member formed with a predetermined cam groove, wherein each of the lens groups is provided with a pin-shaped protrusion which is engaged with the cam groove, the positional relationships among the protrusions is changed upon rotation of the disk member, and the transmitting mechanism further transmits the driving force of the drive source simultaneously to the disk member to rotate the same, whereby the disk member is rotated simultaneously with the movement of the carriage member.

Furthermore, the transmitting mechanism comprises a pair of pulley members, one of the pair of pulley members being coaxially secured to the shaft member, a bobbin member coaxially and integrally provided on the disk member, and a wire member wound around the pair of pulley members and the bobbin member, wherein both ends of the wire member are secured to the bobbin member.

Still further, at least one end of the wire member is secured to the bobbin member with a biasing member therebetween so that a predetermined tension is applied to the wire member.

DESCRIPTION OF THE ACCOMPANYING DRAWINGS

DESCRIPTION OF THE PREFERRED EMBODIMENTS

FIG. 1 to FIG. 9 show an embodiment in which the present invention is applied to a color copy machine.

Figure 2:
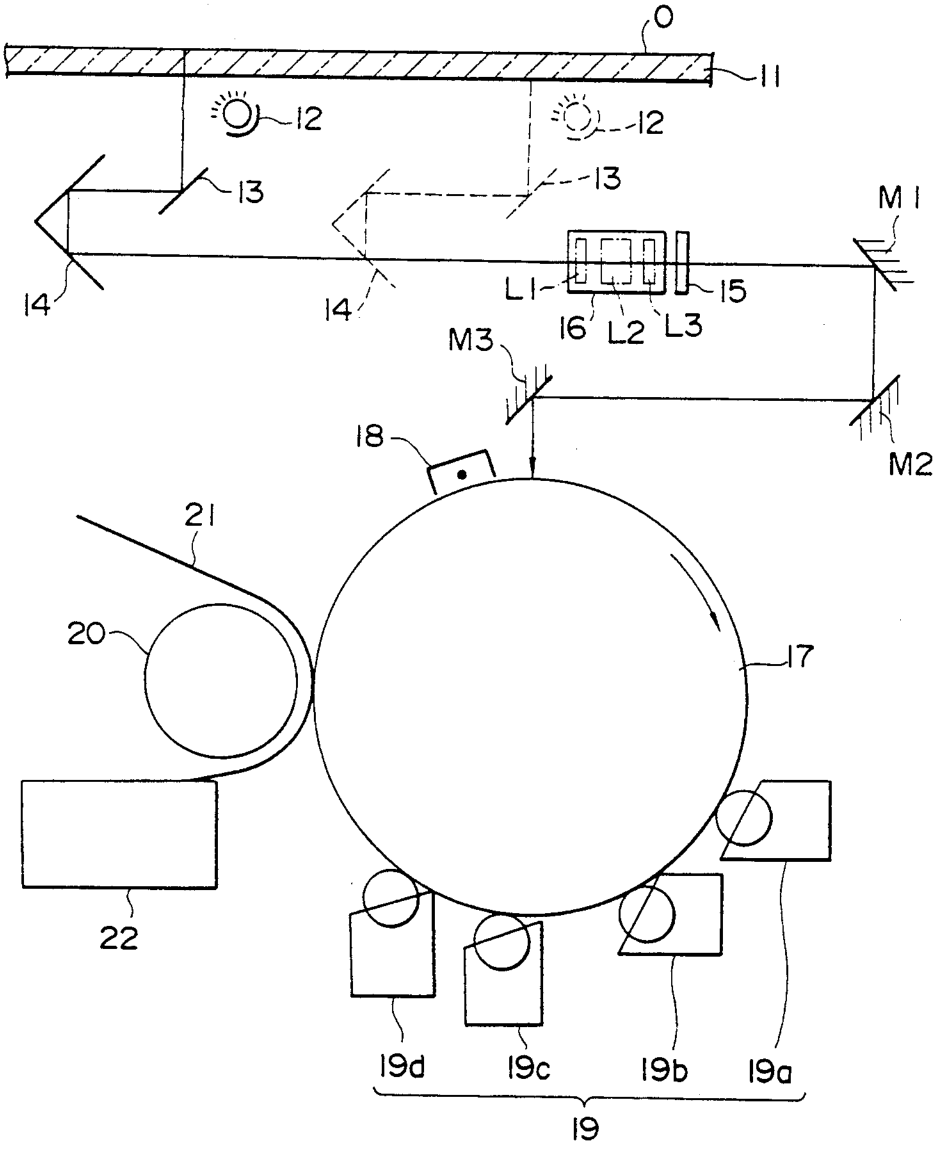
FIG. 2 is a schematic diagram illustrating the color copy machine.

First, the schematic arrangement of an entire device will be described with reference to FIG. 2.

An illumination light source 12 substantially composed of a linear light source and a mirror having a convex cross section and scanning mirrors 13, 14 are disposed below a transparent glass plate 11 on which a document 0 is to be placed. These illumination light source 12 and scanning mirrors 13, 14 are moved between the position shown by a solid line and the position shown by a dotted line by means of a not shown movement mechanism to scan the document with a slit-shaped illumination light. The illumination light reflected from the document is reflected by the scanning mirrors 13, 14 and then directed onto a photosensitive drum 17 as a light receiving means through a zoom lens 16 as an image formation lens, a color decomposition mechanism 15 and a fixed mirror.

The color decomposition mechanism 15 has four filters M, B, G, R, which are selectively inserted into a light path to thereby form a color-decomposed image on the photoconductive drum 17.

The zoom lens 16 has three lens groups L1, L2 and L3 and an image forming magnification can be changed without changing a distance between an image plane and an object, and by changing a distance between the lens groups and moving an entire system.

A charger 18, developing members 19*a*, 19*b*, 19*c* and 19*d* for yellow, magenta, cyanogen and black, respectively, a transfer member 20 and the like are disposed around the photoconductive drum 17 to make a copy by developing an latent image of each color formed on the photoconductive drum 17 and overlapping the same on a paper 21. Designated at 22 is a paper feed mechanism.

Figure 3:
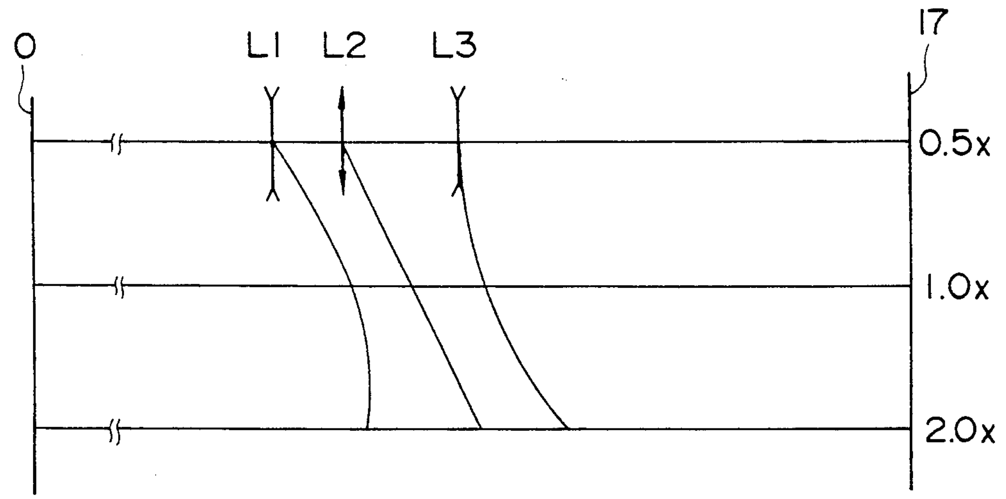
FIG. 3 is a diagram explaining the relation between lens groups and the magnification of an image.
Figure 4:
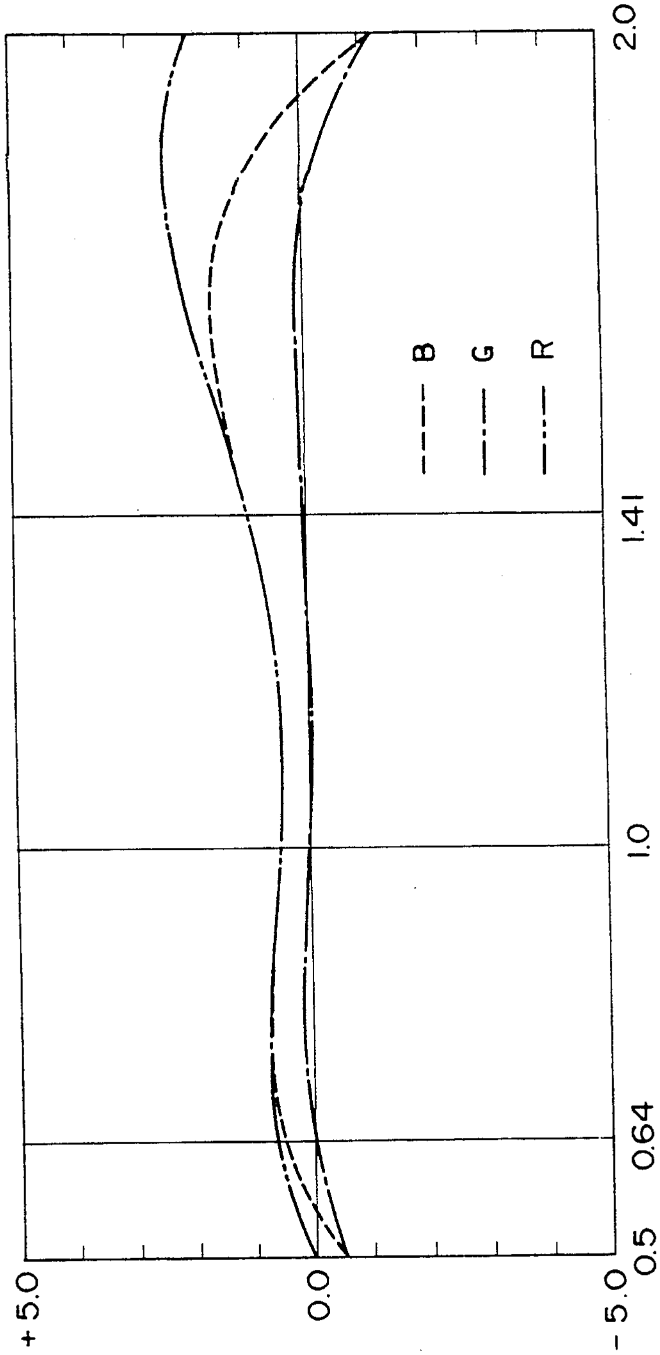
FIG. 4 is a graph showing an amount of dislocation of the image plane of each color from a light receiving plane.

FIG. 3 shows the positions to which the respective lens groups are moved in accordance with an image forming magnification when a monochrome copy is made. In this case, the respective lens groups are independently moved as magnification is changed and the distances between the respective lens groups are as shown in the figure.

The zoom lens 16 is designed so that the monochrome image plane (white image plane) coincides with the circumferential surface of the photoconductive drum 17. Therefore, in this case, no deviation is caused between an image plane and a drum surface even if a magnification is changed, whereas when a color filter B, G, or R is inserted, the image plane is deviated from the drum surface as shown by the broken line, one-dotted line, and two-dotted line in FIG. 4, respectively, wherein the abscissa represents a magnification and the ordinate represents a deviation amount between the drum surface and the image plane. Table 1 shows the amounts of dislocation (unit: mm) of the image plane for typical magnifications, wherein a "−" symbol in the table indicates a dislocation of the image plane toward the original side.

Figure 5:
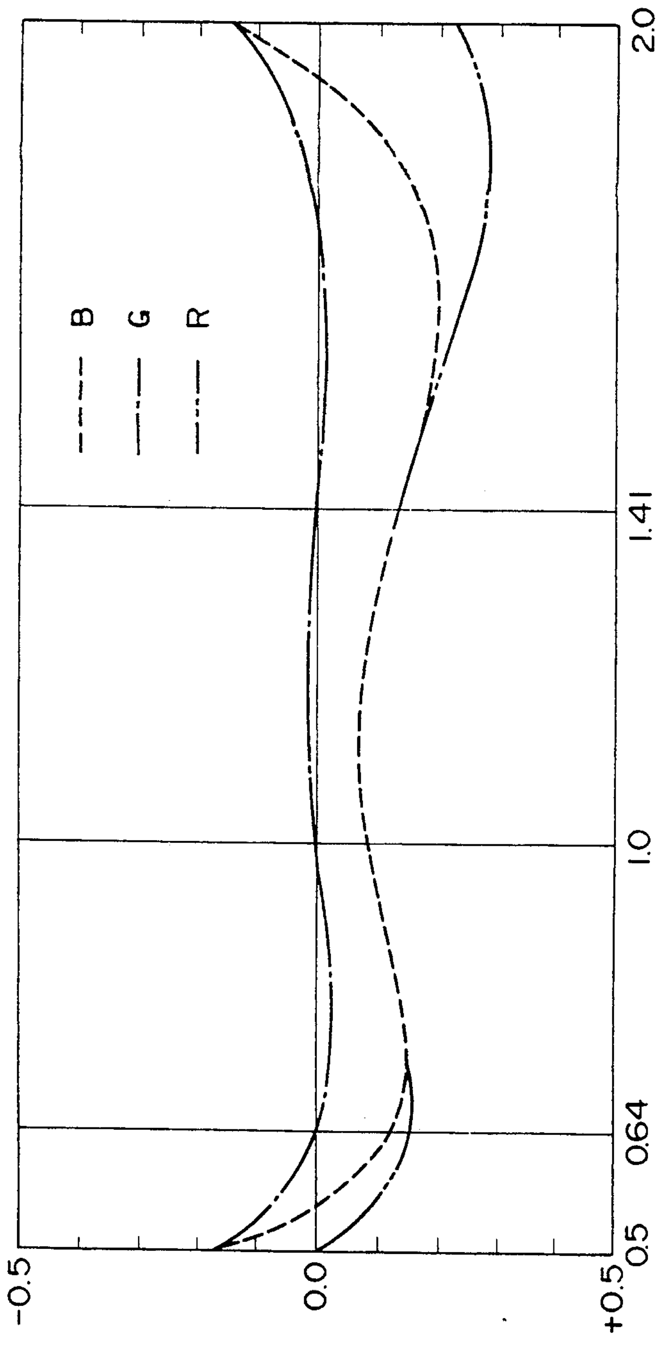
FIG. 5 is a graph showing a correcting amount of a third lens group.

To correct the above dislocation, when the color filter B, G or R is inserted, the third lens group is moved from a reference position by a predetermined amounts for correction. The correction amount are as shown in FIG. 5 (the abscissa represents a magnification and the ordinate represents an amount of correction) and the values thereof corresponding to typical magnifications are shown in Table 2 (unit: mm). As described above, the color-decomposed image can be caused to coincide with the drum surface by correcting the position of the third lens group with respect to the position in which a monochrome copy is made as the filters are changed.

TABLE 1

| Magnification | B | G | R |
|---|---|---|---|
| 0.50 | −0.56 | −0.558 | 0.00 |
| 0.64 | 0.50 | 0.00 | 0.63 |
| 1.00 | 0.50 | 0.00 | 0.50 |
| 1.41 | 1.00 | 0.00 | 1.00 |
| 2.00 | −1.26 | −1.19 | 2.00 |

TABLE 2

| Magnification | B | G | R |
|---|---|---|---|
| 0.50 | −0.169 | −0.168 | 0.000 |
| 0.64 | 0.121 | 0.000 | 0.152 |
| 1.00 | 0.084 | 0.000 | 0.084 |
| 1.41 | 1.134 | 0.000 | 0.134 |
| 2.00 | −0.144 | −0.136 | 0.228 |

Note, Table 3 shows the correction movement amounts (unit: mm) to be made to correct the deviation of an image plane by moving the first lens group instead of the third lens group.

TABLE 3

| Magnification | B | G | R |
|---|---|---|---|
| 0.50 | 0.255 | 0.254 | 0.000 |
| 0.64 | −0.155 | 0.000 | −0.195 |
| 1.00 | −0.084 | 0.000 | −0.084 |
| 1.41 | −0.111 | 0.000 | −0.111 |
| 2.00 | 0.095 | 0.090 | −0.151 |

Next, a mechanical arrangement for moving the lenses will be described with reference to FIGS. 6 to 9.

Figure 6:
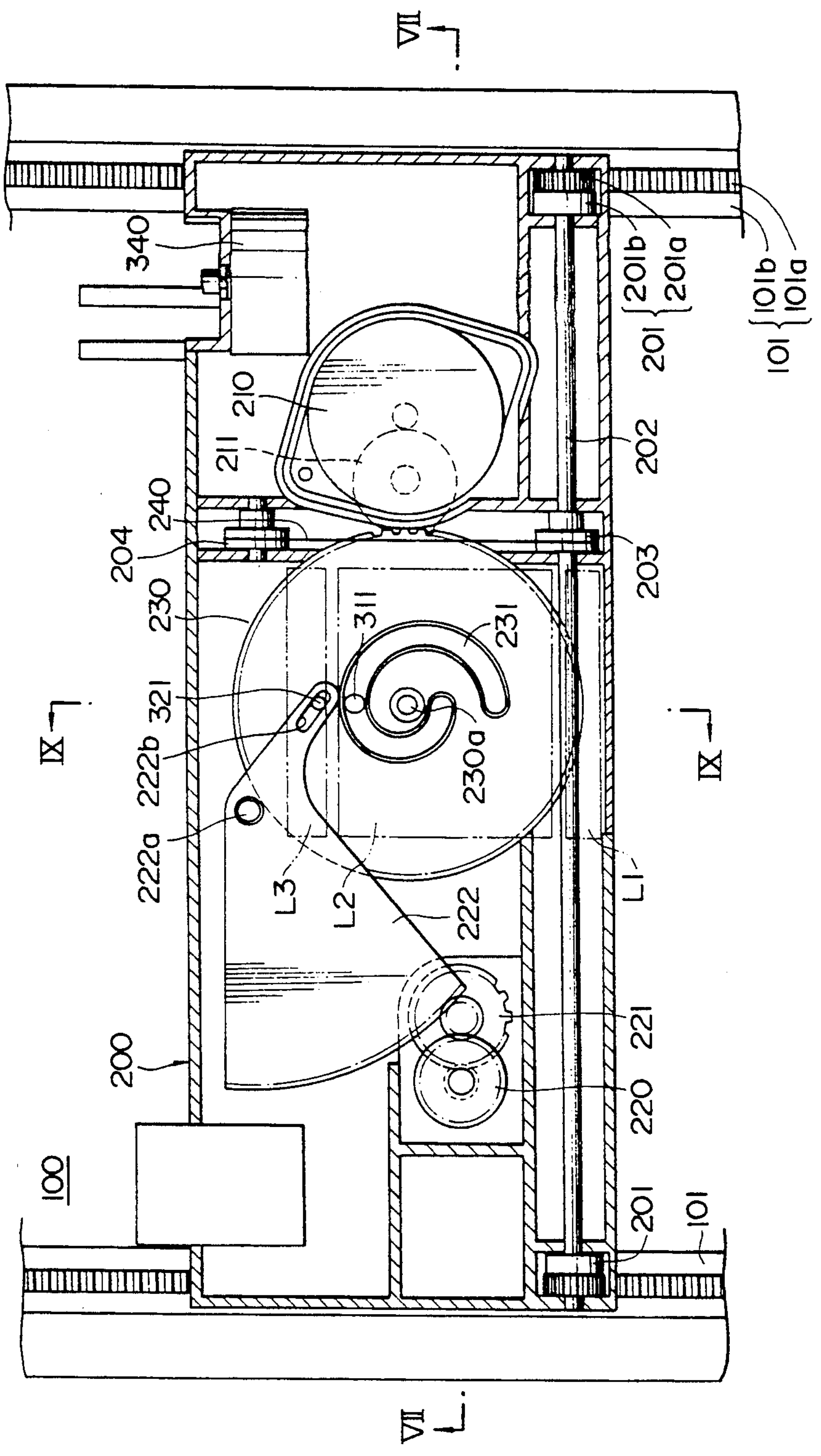
FIG. 6 is a plan view of the lens drive mechanism of the optical device embodying the present invention.

As shown in FIG. 6, a main body 100 has two guide rails 101, 101 extending in the direction of the optical axis of the zoom lens 16, and a carriage 200 is placed on the guide rails 101, 101. Each of the guide rails 101 is composed of an outer half rack 101*a* and an inner half flat-shaped rail 101*b*. On the other hand, the carriage 200 has rotary members 201, 201 that are each composed of a pinion 201*a* serving as a carriage drive means to be meshed with the rack 101*a*, and a wheel 201*b* sliding on the rail 101*b*. The rotary members 201, 201 are mounted on the opposite ends of a shaft 202 which is rotatably supported by an end of the carriage 200 perpendicular to the guide rails 101, 101. Lower surfaces of the side portions of the other end portion (upper side end portion in FIG. 6) of the carriage 200 are arranged to be slidably mounted on the rails 101*b*, 101*b*.

A main motor 210 serving as a first drive means and an auxiliary motor 220 serving as a second drive means are disposed on the carriage 200. The former moving the carriage 200 as a whole, and further the second lens group L2 with respect to the carriage 200, and the latter moves the third lens group L3 with respect to the carriage 200 independently of the fist drive means.

Figure 7:
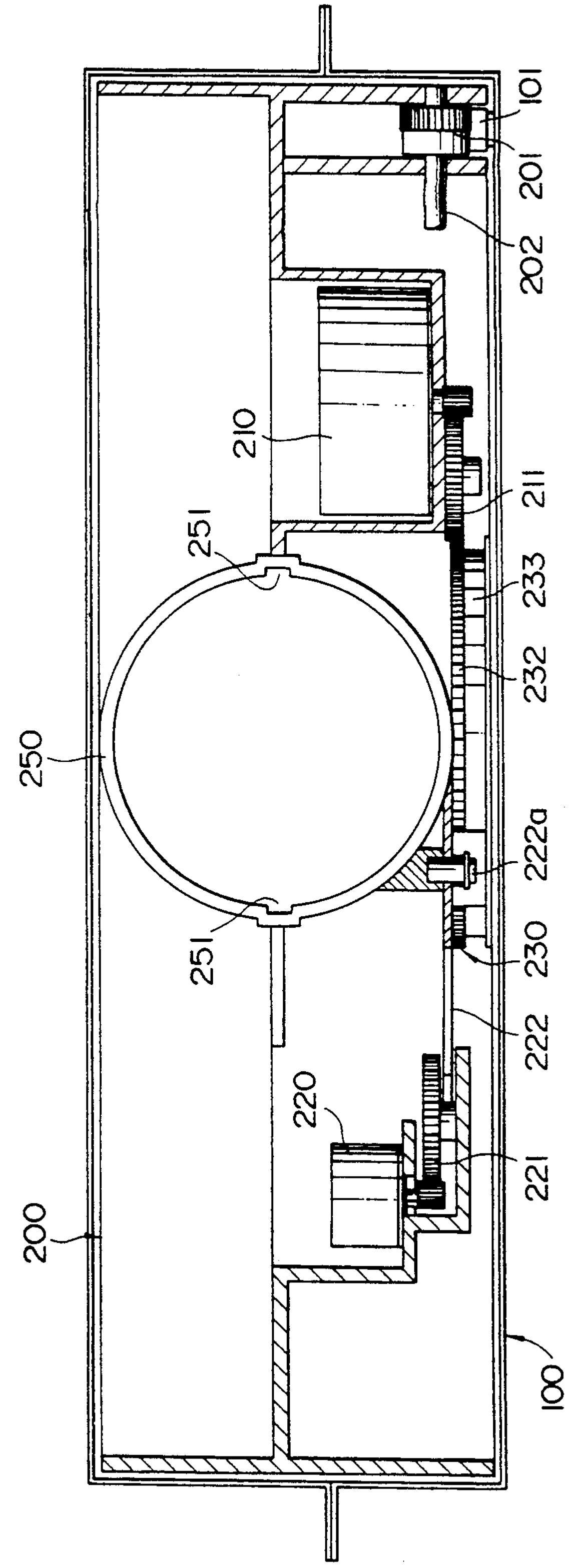
FIG. 7 is a cross sectional view taken along the line VII—VII of FIG. 6.

As shown in FIGS. 6 and 7, the main motor 210 drives a disk-shaped cam 230 provided at substantially the center of the carriage 200 through an intermediate gear 211. The cam 230 is rotatably attached to the carriage 200 through a rotary shaft 230*a* and has a spiral-shaped cam groove 231 shown in FIG. 6 on the upper surface thereof, a gear portion 232 to be meshed with the intermediate gear 211, and a bobbin portion 233 having a diameter smaller than that of the gear portion 232, each defined on the circumference of the cam 230. The bobbin portion 233 is used to wind a synchronizing wire therearound, which is described below.

The auxiliary motor 220 drives a fan-shaped gear 222 through a reduction gear 221. The fan-shaped gear 222 is pivoted to the carriage 200 by a shaft 222*a* and formed with a slot 222*b* defined at the extreme end thereof.

Note that the numeral 340 in FIG. 6 is a motor for changing the filters. A filter change mechanism is a known mechanism such as that disclosed in Japanese Patent Provisional Publication No. SHO 63-311275 and thus the detailed description thereof is omitted here.

A mechanism for moving the carriage 200 as a whole will be described below.

Figure 8:
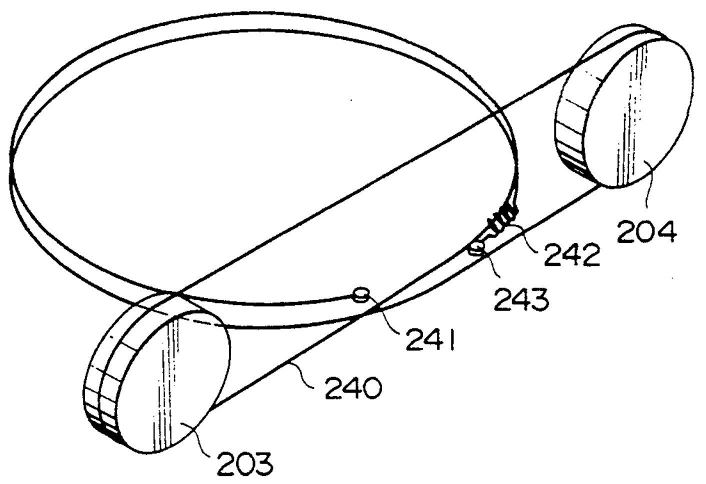
FIG. 8 is a perspective view explaining the winding of a synchronization wire.

As shown in FIGS. 6 and 7, the synchronizing wire 240, which is stretched between two pulleys 203, 204 spaced apart from each other in the direction of the optical axis of the zoom lens 16, is trained around the bobbin portion 233 of the cam 230 as shown in FIG. 8. An end of the synchronizing wire 240 is connected to the pin 241 fixed to the cam 230 and the other end thereof is connected to the pin 243 also fixed to the cam 230 through a tension spring 242, so that a tension is always applied to the synchronizing wire 240. The synchronizing wire 240 travels around the circumferential edge of the bobbin portion 233 of the cam 230 starting from each end of the wire and changes the direction thereof by 90°, so that the synchronizing wire 240 is stretched in the horizontal direction on the cam 230 side and stretched in the vertical direction on the pinion 201*a* side and trained between the pulleys 203, 204. Note that the rotary shaft 230*a* is arranged perpendicular to the shaft 202. With this arrangement, when the cam 230 is rotated by the main motor 210, the synchronous pulley 203 is rotated through the synchronizing wire 240. Since the synchronous pulley 203 is fixed to the shaft 202 to which the above rotary members 201, 201 are fixed, the rotation of the synchronous pulley 203 causes the carriage 200 to be moved as a whole synchronously with the rotation of the cam 230 in the direction of the optical axis of the zoom lens 16 along the rack 101*a*.

As constructed above, a pair of rotary members 201, 201, which are arranged at the both side portions of the carriage 200 and sufficiently apart from each other, are rotated to move the carriage 200. Compared with the conventional construction in which a carriage is driven by being pulled at a portion deviated from a center of gravity, in the device according to the present invention, the carriage 200 can move smoothly while sliding on the guide rails 101, 101. Further, jolt during movement of the carriage 200 and tilt of the zoom lens 16 due to a backlash between the rack 101*a* and the pinion 201*a* can be reduced.

Further, a conventional optical device has a carriage drive mechanism disposed on the main body side thereof, a pair of light shield plates are provided on the opposite side walls of a carriage opposite to the surface of the lens mounted on the carriage to prevent stray light from entering the lens, and each of the light shield plates has an escape portion (cutout) to prevent the same from contacting the carriage drive mechanism. With this conventional arrangement, the stray light necessarily enters a zoom lens through the escape portions of the shield plates. On the contrary, in the optical device according to the present invention, the stray light due to an illuminated light can be sufficiently prevented from entering the zoom lens.

Next, a mechanism for moving the respective lens groups will be described.

Figure 9:
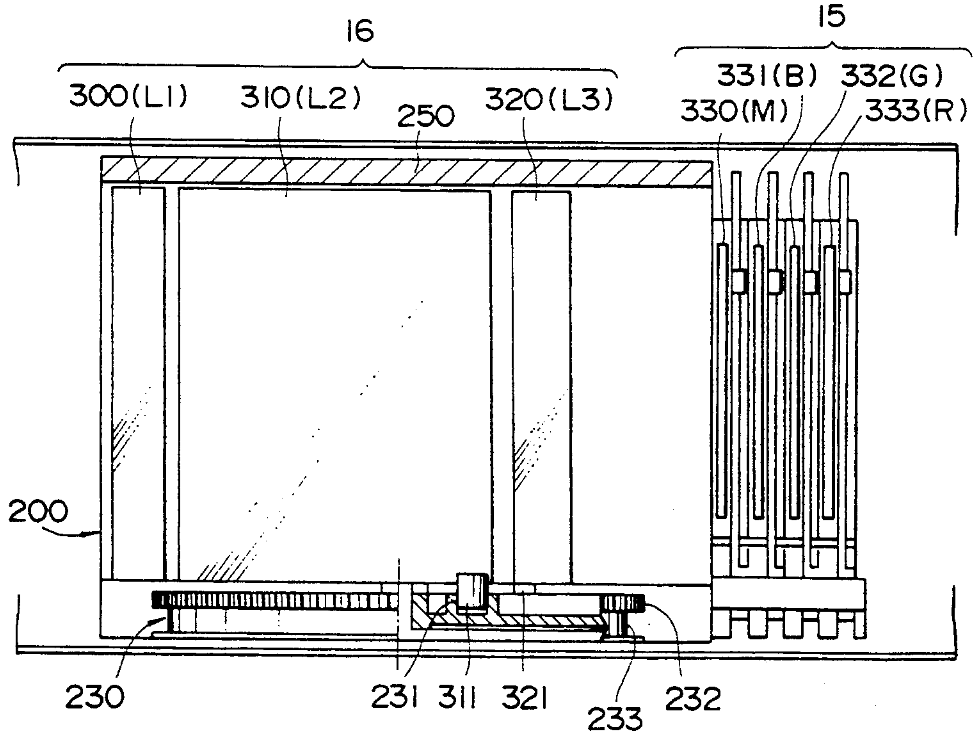
FIG. 9 is a cross sectional view taken along the line IX—IX of FIG. 6.

The first through third lens groups L1, L2, and L3 are accomodated in first through third lens barrels 300, 310, 320, respectively, as shown in FIG. 9. The lens barrels are accommodated in a cylinder 250 for allowing the lens barrel to slide. A rotation prevention groove 251 is formed on inner surface of the cylinder 250 for preventing the rotation of the lens barrels, and projections (not shown) to be engaged with the groove 251 are protruded from the lens barrels, respectively.

Further, the color separation mechanism 15 is disposed on the drum side end (right hand side in FIG. 9) of the carriage 200 for selectively inserting the color filters 330 (M), 331 (B), 332 (G) and 333 (R) into the light path.

The first lens barrel 300 is fixed to the carriage 200 and moved by the same amount as that of the carriage by the main motor 210 acting as a first drive means.

The second lens barrel 310 has a pin 311 to be engaged with the cam groove 231 of the cam 230 and is moved relatively to the carriage 200 by the main motor 210.

The third lens barrel 320 has a pin 321 to be engaged with the slot 222*b* of the fan-shaped gear 222 and is moved with respect to the carriage 200 by the auxiliary motor 220 independently of the second lens barrel 310.

Figure 1:
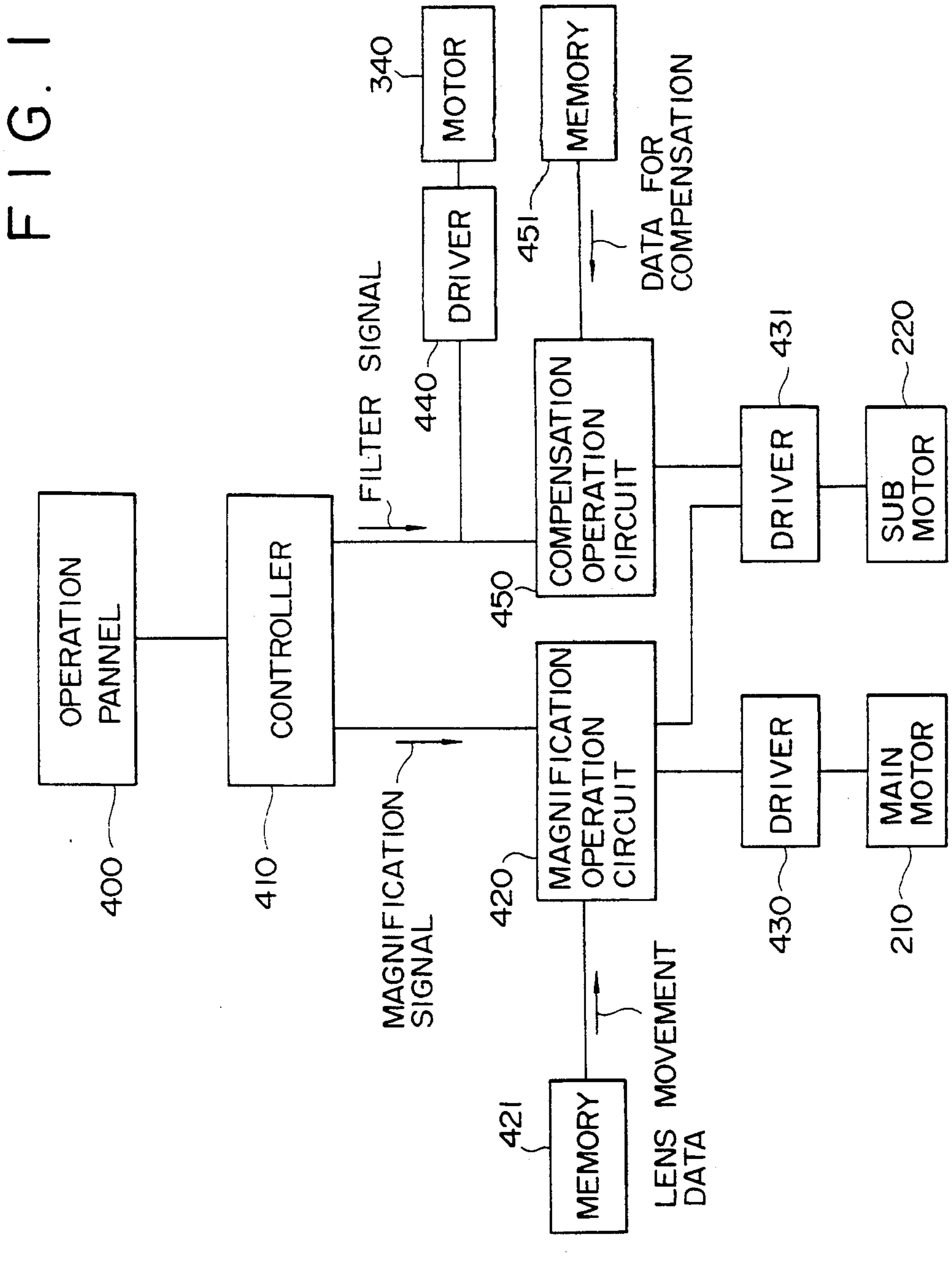
FIG. 1 is a block diagram of a control system of a color copy machine to which an optical device embodying the present invention is applied.

Next, the control system of the above color copy machine will be described with reference to the block diagram shown in FIG. 1. Note that only the functions, such as a magnification changing function and color changing function, which relate to the present invention are shown in FIG. 1, and the scanning function of the light source 12, mirrors 13 and 14, the control of the charger 18, developing members 19*a*–19*d* transfer members 20 and the like are omitted.

When a user selects a magnification or color/monochrome copy mode on an operation panel 400, the data thereof is transmitted from the operation panel 400 to a controller 410.

When the magnification is changed, a magnification signal is transmitted from the controller 410 to a magnification operation circuit 420 and the positions of the respective lenses corresponding to the magnification are read out from a memory 421 in which lens movement data in a monochrome mode is stored. Then driving amounts of the main and auxiliary motors are calculated based on the read data of lens positions and the currently set lens positions to drive the respective motors through drivers 430 and 431.

When a monochrome copy mode is selected, a copy can be made by setting only the magnification as above.

Note, when data particular to each device, such as the focal length error and the like of each lens of the device, is additionally provided as input to the memory 421, even the deviation of an image caused by these errors can be corrected.

When a color copy mode is selected, the filters must be changed as well as the magnification. First, a filter change signal is transmitted from the controller 410 to a driver 440, the monochrome (M) filter 330 is inserted into the light path and then a copy is carried out. Subsequently, the B, G and R filters 331, 332 and 333 are sequentially changeably inserted into the light path and a compensation operation circuit 450 reads a correction amount out of a memory 451 storing compensation data in accordance with the change of the filters and transmits a drive signal to a driver 431. The driver 431 drives the auxiliary motor 220 based on the signals transmitted from both the magnification operation circuit 420 and the compensation operation circuit 450.

With this arrangement, the position to which the third lens group is moved is compensated in accordance with the selection of the color filters, so that an image plane is caused to coincide with the drum surface even if any color of light is projected to the drum surface and deviations of the image due to the color of light and the magnification are not caused.

Further, a complex movement of the lenses, which would be difficult by a mechanical control using cams, can be easily achieved by controlling the movement of the lenses by making use of the two motors as described above. Therefore, the deviation of an image plane can be compensated by controlling the movement of the lenses without perfectly correcting the chromatic aberration of an image formation lens, and thus an expensive glass material having less dispersion need not be used for the image formation lens.

Further, the amount of movement can be changed only by changing software.

Note that if means for sensing the environment in which the device is used, such as temperature, humidity and the like, and means for calculating driving amount of the motors for compensating the position of an image by using them as parameters are added, the deviation of the image caused by the change of the environment can also be compensated.

As described above, according to the optical device of the present invention, since the zoom lens composed of a plurality of the lens groups, the cam for determining the positional relation between the lens groups, the cam drive source for driving the cam, and the carriage drive mechanism for moving itself in the direction of the optical axis of the zoom lens are all disposed on the carriage, and the synchronizing wire is interposed between the carriage drive mechanism and the cam for synchronizing them, the present invention can provide the effects that a performance for preventing stray light caused by an illuminated light is increased, a tolerance of dislocation of the optical axis of the zoom lens can be kept within an allowable range, the device can be produced in large quantities and made compact, and costs such as a transportation cost and the like can be reduced.

Further, since the deviation of the image plane can be compensated by moving one of the lens groups, however many filters are employed, the deviation of the image plane can be easily compensated without changing the construction of the device.

The present disclosure relates to subject matters contained in Japanese Patent Applications Nos. HEI 2-278547 (filed on Oct. 16, 1990) and HEI 3-226639 (filed on May 28, 1991) which are expressly incorporated herein by references in their entireties.

What is claimed is:

1. An optical device employed in an imaging apparatus in which an image of an object is formed on a predetermined plane through a plurality of lens groups, said plurality of lens groups being coaxially arranged and used for changing the magnification of said object image formed on said predetermined plane, a plurality of filters for respectively allowing predetermined colors of light to pass therethrough being selectively inserted into the light path between said object and said predetermined plane, said optical device comprising:

first drive means for driving said plurality of lens groups as a unit along the optical axis thereof while correspondingly changing the positional relation among the respective lens groups;

second drive means for independently driving at least one of said plurality of lens groups along said optical axis;

first control means for controlling said first and second drive means to drive said plurality of lens groups in accordance with a desired image magnification; and second control means for controlling said second drive means to drive said at-least-one of said plurality of lens groups, depending upon the selected filter, so as to place the object image on said predetermined plane.

2. The optical device according to claim 1, wherein said first drive means comprises:

a carriage member arranged to be movable along said optical axis, on which said plurality of lens groups are movably mounted to permit movement of the respective lens groups relative to others;

a position regulating member mounted on said carriage member, upon movement of which the positional relation among the respective lens groups is changed in a predetermined manner;

a driving source carried by said carriage member; and transmittal means carried by said carriage member for transmitting a driving force of said driving source simultaneously to said carriage member and to said position regulating member such that said position regulating member is moved in said predetermined manner corresponding to the movement of said carriage member along said optical axis.

3. The optical device according to claim 2, wherein said position regulating member comprises a rotatable disk member formed with a predetermined cam groove, each of said lens groups is provided with a pin-shaped protrusion which is engaged with said cam groove, and the positional relationships among said protrusions is changed upon rotation of said disk member.

4. The optical device according to claim 3, wherein said second drive means comprises a swing arm member formed with a cam slit, the pin-shaped protrusion of said at-least-one lens group is engaged with said cam slit; and wherein said protrusion of the at-least-one lens group is moved along said cam groove upon movement of said swing arm member, whereby said at-least-one lens group is independently moved relative to the other lens groups.

5. The optical device according to claim 1, wherein said first control means comprises memory means for storing data of the respective positional relations of said plurality of lens groups relating to a plurality of possible selected magnifications, and first calculating means for calculating the driving amount of said lens groups in accordance with said selected magnification.

6. The optical device according to claim 5, wherein said second control means comprises memory means for storing compensation data of the positional relation of said at-least-one lens group with respect to the others, for respective one of said plurality of filters; and second calculating means for calculating the driving amount of said at-least-one lens group based on one of said compensation data corresponding to said selected filter.

7. The optical device according to claim 1, said second control means controlling said second drive means to drive said at least one lens group independently of said plurality of lens groups.

8. An optical device for use in an imaging apparatus in which an image of an object is formed on a predetermined plane by a plurality of lens groups, a magnification of the image formed on the predetermined plane can be changed, including a plurality of filters for allowing predetermined colors of light to pass therethrough, a selected filter of the plurality of filters being selectively insertable into a light path between the object and the predetermined plane, said optical device comprising:

first means for driving said plurality of lens groups along an optical axis of said plurality of lens groups and for moving a predetermined lens group of said plurality of lens groups with respect to said plurality of lens groups along the optical axis;

second means, independent of said first means, for driving a specific lens group of said plurality of lens groups along the optical axis with respect to said plurality of lens groups;

first control means, for controlling said first and second drive means to drive said plurality of lens groups to change an image magnification to a predetermined image magnification; and second control means, for controlling said second drive means to drive said specified lens group of said plurality of lens groups, in accordance with insertion of a selected filter into the light path so as to form the image on the predetermined plane.

9. The optical device according to claim 8, further comprising means mounting said plurality of lens groups for movement along the optical axis, said first means comprising means for moving said predetermined lens group of said plurality of lens groups with respect to said mounting means.

10. The optical device according to claim 8, said first driving means comprising a first motor and said second driving means comprising a second motor.

11. The optical device according to claim 10, further comprising a carriage for moving said plurality of lens groups along the optical axis, said first and second motors being mounted for movement with said carriage.

12. The optical device according to claim 8, said first driving means comprising a first motor drivingly coupled to a first cam for driving said predetermined group of said plurality of lens groups, said second driving means comprising a second motor drivingly coupled to a second cam for driving said specified lens group of said plurality of lens groups.

13. The optical device according to claim 8, said first driving means comprising a carriage movable along the optical axis, means mounting said plurality of lens groups on said carriage for movement together with said carriage and for movement of said predetermined and specified lens groups of said plurality of said lens groups with respect to said carriage, a position regulating member mounted to said carriage, means for mounting said position regulating member for movement with respect to said carriage, said position regulating member comprising means for moving said predetermined lens group said plurality of said lens groups.

14. The optical device according to the claim 13, said first driving means further comprising means carried by said carriage for simultaneously transmitting a driving force to said carriage member and to said position regulating member, whereby said position regulating member is moved in accordance with the movement of the carriage along the optical axis.

15. The optical device according to claim 8, said first control means comprising first means for storing data regarding movement of said plurality of lens groups in accordance with changes in magnification of an image and first means for calculating a magnitude of movement of said plurality of lens groups in accordance with a selected magnification.

16. The optical device according to claim 15, said second control means comprising second means for storing data regarding compensation for the positional relation of said specified lens group of said plurality of lens groups with the respect to said plurality of lens groups for each of said plurality of filters and second means for calculating a driving amount of said specified lens group of said plurality of lens groups in accordance with said compensation data for each said selected filter.

17. The optical device according to claim 8, further comprising third means for controlling said first and second drive means in accordance with environmental factors affecting the position of an image, with respect to the predetermined plane.

18. The optical device according to claim 17, said third means comprising means for storing compensation values and means for calculating driving amounts for said first and second drive means in accordance with environmental factors affecting the position of an image.

19. The optical device according to claim 18, said compensation values comprise means for compensating for the effect of temperature.

20. The optical device according to claim 18, said compensation values comprise means for compensating for the effect of humidity.

* * * * *

UNITED STATES PATENT AND TRADEMARK OFFICE

CERTIFICATE OF CORRECTION

PATENT NO. : 5,291,241

DATED : March 1, 1994

INVENTOR(S) : H. HIRANO et al.

It is certified that error appears in the above-indentified patent and that said Letters Patent is hereby corrected as shown below:

At column 10, line 23 (claim 4, line 4) of the printed patent, change "slit; and" to ---, and---.

At column 10, line 24 (claim 4, line 5) of the printed patent, delete "wherein".

Signed and Sealed this

Eighteenth Day of March, 1997

Attest:

BRUCE LEHMAN

*Attesting Officer*

*Commissioner of Patents and Trademarks*